(12) United States Patent
Wang

(10) Patent No.: US 9,762,110 B2
(45) Date of Patent: Sep. 12, 2017

(54) LINEAR VIBRATOR

(71) Applicant: Changliang Wang, Shenzhen (CN)

(72) Inventor: Changliang Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/001,857

(22) Filed: Jan. 20, 2016

(65) Prior Publication Data
US 2016/0294271 A1 Oct. 6, 2016

(30) Foreign Application Priority Data

Apr. 1, 2015 (CN) .................... 2015 2 0194325 U

(51) Int. Cl.
*H02K 33/16* (2006.01)
(52) U.S. Cl.
CPC .................... *H02K 33/16* (2013.01)
(58) Field of Classification Search
CPC ..................................... H02K 33/16
See application file for complete search history.

(56) References Cited

U.S. PATENT DOCUMENTS

| | | | | |
|---|---|---|---|---|
| 7,911,098 B2* | 3/2011 | Lee | ......................... | H02K 33/16 310/20 |
| 7,999,421 B2* | 8/2011 | Kim | ....................... | H02K 33/18 310/15 |
| 8,288,898 B2* | 10/2012 | Jun | ......................... | H02K 33/16 310/13 |
| 8,624,449 B2* | 1/2014 | Kim | ....................... | H02K 33/16 310/25 |
| 8,624,450 B2* | 1/2014 | Dong | ..................... | H02K 33/16 310/15 |
| 8,643,229 B2* | 2/2014 | Park | ....................... | H02K 33/16 310/15 |
| 8,829,741 B2* | 9/2014 | Park | ....................... | B06B 1/045 310/25 |
| 8,878,401 B2* | 11/2014 | Lee | ......................... | B06B 1/045 310/15 |
| 9,024,489 B2* | 5/2015 | Akanuma | .............. | H02K 33/02 310/15 |
| 9,306,429 B2* | 4/2016 | Akanuma | ................ | H02K 5/24 |
| 9,312,744 B2* | 4/2016 | Akanuma | ............. | H02K 33/00 |
| 2003/0227225 A1* | 12/2003 | Kaneda | ................... | B06B 1/045 310/81 |
| 2009/0096299 A1* | 4/2009 | Ota | ........................ | B06B 1/045 310/25 |

(Continued)

*Primary Examiner* — Naishadh Desai
(74) *Attorney, Agent, or Firm* — Na Xu; IPro, PLLC

(57) ABSTRACT

A linear vibrator includes a housing with an accommodation space; a vibrating part received in the accommodating space; and a plurality of elastic members for suspending and supporting the vibrating part in the housing. The elastic member includes two holding parts connecting to the housing and the vibrating part respectively. The holding part includes a first end part and the second end part away from the first end. An interconnecting part is provided to connect the two holding parts, and includes a main body part and bending parts extending from two ends of the main body part respectively. The bending part includes a first arc part, and a second arc part extending from the first arc part, a bending direction of the first arc part being contrary to a bending direction of the second arc part.

7 Claims, 2 Drawing Sheets

(56) References Cited

U.S. PATENT DOCUMENTS

| | | | |
|---|---|---|---|
| 2011/0089772 A1* | 4/2011 | Dong | H02K 33/16 310/25 |
| 2011/0101797 A1* | 5/2011 | Lee | H02K 33/16 310/29 |
| 2011/0115310 A1* | 5/2011 | Dong | H02K 33/16 310/28 |
| 2011/0115311 A1* | 5/2011 | Dong | H02K 33/16 310/28 |
| 2011/0316361 A1* | 12/2011 | Park | H02K 33/16 310/25 |

* cited by examiner

LINEAR VIBRATOR

FIELD OF THE INVENTION

The present invention relates to vibrators for converting electrical signals into tactile sensation, and more particularly related to a linear vibrator used for portable consumer electronic product.

DESCRIPTION OF RELATED ART

With the development of electronic technology, portable consumer electronic products such as cell phone, handheld game console, navigation equipment or handheld multimedia recreation equipment etc. are pursued and admired by more and more people. These electronic products generally use linear vibrators to feedback such as income call alert, information cue, navigation alert and vibrating feedback of game console etc.

The linear vibrator of the related technology includes a housing, a vibrating unit set inside the mentioned housing and an elastic member used for suspending the vibrating unit inside the housing. One end of the elastic member is connected with the vibrating unit. The other end of that is connected with the housing. Sufficient driving force should be guaranteed when the linear vibrator works. However, the large driving force can cause over large amplitude of the vibrating unit and the stress received by elastic member will increase too, so it is easy to break on the concentrated area of stress of the elastic member.

Therefore, it is necessary to provide an improved linear vibrator to solve the problems mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
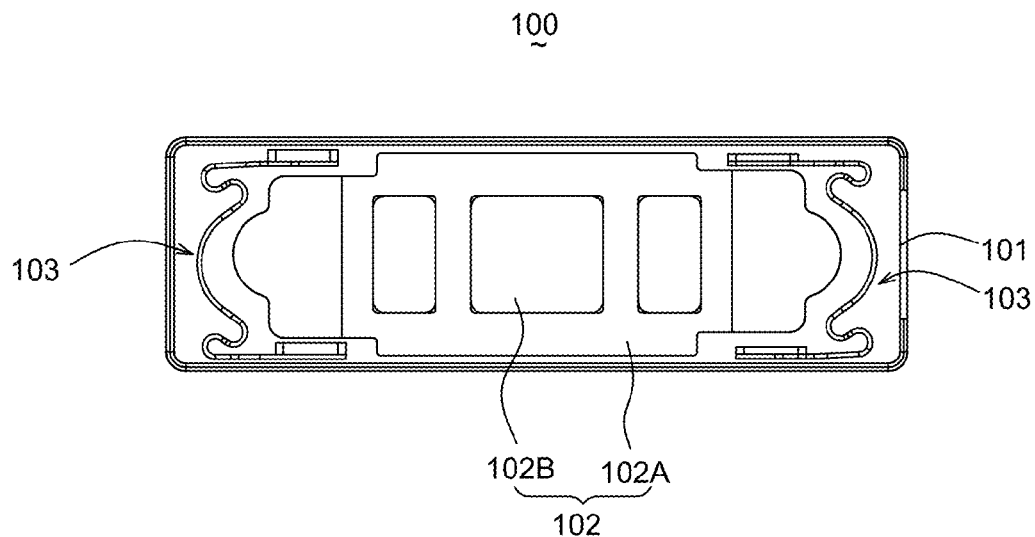
FIG. 1 is a front view of a linear vibrator in accordance with an exemplary embodiment of the present disclosure.
Figure 2:
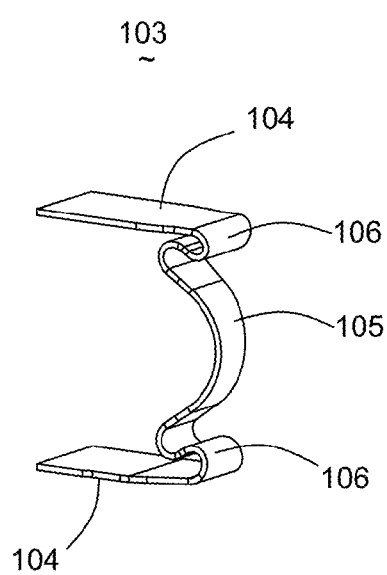
FIG. 2 is an isometric view of an elastic member of the linear vibrator in FIG. 1.

As shown as in FIG. 1 and FIG. 2, a linear vibrator 100 in accordance with an exemplary embodiment of the present disclosure includes a housing 101, a vibrating part 102 inside the housing 101, and an elastic member 103 used for suspending the vibrating part 102 in the housing 101. The vibrating part 102 includes a weight 102A with an accommodation hole, and a magnet 102B received in the accommodation hole.

The elastic member 103 includes two holding parts 104 connecting with the housing 101 and the weight 102 respectively, and a connecting part connecting two holding parts 104. Two holding parts 104 generally are set in parallel and intervally.

Figure 3:
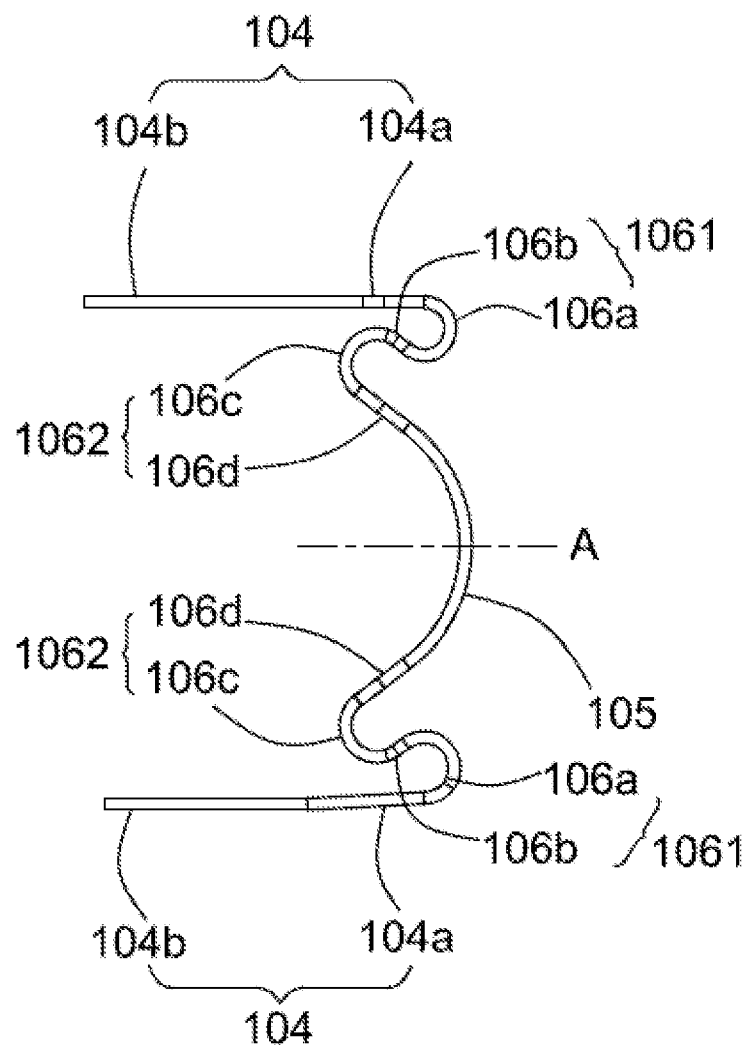
FIG. 3 is a front view of the elastic member of the linear vibrator.

Shown as in FIG. 3, each holding part 104 includes a first end part 104a connecting with the connecting part and a second end part 104b away from the first end part 104a. The connecting part includes an arc-shaped main body part 105 and two bending parts 106 extending from two ends of the main body part 105 respectively. Each bending part 106 includes a first arc part 1061 connecting with the first end part 104a and a second arc part 1062 bending and extending from the first arc part 1061 and connecting with the main body part 105. The first arc part 1061 extends away from the first end part 104a and then bends toward the second end part 104b. A bending direction of the second arc part 1062 is contrary to that of the first arc part 1061.

Specifically, in the exemplary embodiment, the first arc part 1061 includes a convex semi-circle 106a connecting with the first end part 104a, and a first linear segment 106b extending from other end of convex semi-circle 106a close to the second end part 104b. The second arc part 1062 includes a concave semi-circle 106c connecting with the first linear segment 106b and a second linear segment 106d extending from other end of the concave semi-circle 106c to the main body part 105. Each bending part 106 is S-shaped generally. The two bending parts 106 are arranged at two ends of the main body part symmetrically about a straight line A through a center of the main body part 105. Optionally, a radius of curvature of the convex semi-circle 106a is equal to that of the concave semi-circle 106c.

The main body 105 is also arc-shaped. Its bending direction is contrary to that of the second arc part. Specifically, the main body part 105 is one convex semi-circle. Its radius of curvature is greater than that of the first arc part or the second arc part, and is greater than that of the convex semi-circle 106a and the concave semi-circle 106c The S-shaped bending part and the arc-shaped main body make the stress of the elastic member 103 of the above structure to be distributed more even. The maximum stress is reduced greatly under the premise of guaranteeing the quality of weight and the fixed frequency of linear vibrator meeting requirements; it has great help to improve the fatigue life of the elastic member.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A linear vibrator, comprising:
a housing with an accommodation space;
a vibrating part received in the accommodating space;
a plurality of elastic members for suspending and supporting the vibrating part in the housing, the elastic member including:

two holding parts connecting to the housing and the vibrating part respectively, each holding part comprising a first end part and a second end part away from the first end part;

an interconnecting part connecting the two holding parts, the interconnecting part including a main body part and two bending parts extending from two ends of the main body part respectively, each bending part including a first arc part connecting with the first end part and a second arc part extending from the first arc part and connecting with the mentioned main body, the first arc part extending away from the first end part and then bending toward the second end part, a bending direction of the first arc part being contrary to a bending direction of the second arc part.

2. The linear vibrator as described in claim 1, wherein the first arc part includes a convex semi-circle with one end connecting with the first end part, and a first linear segment extending from the other end of the convex semi-circle toward the second end part, the second arc part includes a concave semi-circle connected with the first linear segment and a second linear segment extending from one end of the concave semi-circle arc toward the main body.

3. The linear vibrator as described in claim 2, wherein a radius of curvature of the convex semi-circle is equal to that of the concave semi-circle.

4. The linear vibrator as described in claim 1, wherein the main body is arc-shaped and a bending direction of the main body is opposed to a bending direction of the second arc-shaped part.

5. The linear vibrator as described in claim 4, wherein a radius of curvature of the main body is greater than that of the first arc part or the second arc part.

6. The linear vibrator as described in claim 1, wherein the two bending parts are arranged symmetrically at two ends of the main body part.

7. The linear vibrator as described in claim 1, wherein the two holding parts face each other.

* * * * *